United States Patent
Gilbert et al.

(10) Patent No.: US 12,160,198 B2
(45) Date of Patent: Dec. 3, 2024

(54) DEVICE AND METHOD FOR DETERMINING AND USING A SURPLUS OF AVAILABLE ELECTRICAL POWER GENERATED BY A SOLAR PHOTOVOLTAIC GENERATOR

(71) Applicants: Global Inventions, Rousset (FR); Joël Gilbert, Saint Julien (FR)

(72) Inventors: Joël Gilbert, Saint Julien (FR); Bernard Nonnenmacher, Rousset (FR)

(73) Assignee: GLOBAL INVENTIONS, Rousset (FR)

( * ) Notice: Subject to any disclaimer, the term of this patent is extended or adjusted under 35 U.S.C. 154(b) by 16 days.

(21) Appl. No.: 18/042,060

(22) PCT Filed: Aug. 17, 2021

(86) PCT No.: PCT/FR2021/000094
§ 371 (c)(1),
(2) Date: Feb. 17, 2023

(87) PCT Pub. No.: WO2022/038319
PCT Pub. Date: Feb. 24, 2022

(65) Prior Publication Data
US 2023/0318528 A1    Oct. 5, 2023

(30) Foreign Application Priority Data
Aug. 19, 2020    (FR) ...................................... 2008557

(51) Int. Cl.
*H02S 50/00*    (2014.01)
*H02J 3/38*    (2006.01)
(Continued)

(52) U.S. Cl.
CPC .............. *H02S 50/00* (2013.01); *H02J 3/381* (2013.01); *H02S 40/32* (2014.12); *H02J 7/35* (2013.01); *H02J 2300/26* (2020.01)

(58) Field of Classification Search
CPC ........ H02S 50/00; H02S 40/32; H02J 3/381; H02J 7/35; H02J 2300/26
(Continued)

(56) References Cited

U.S. PATENT DOCUMENTS 9,564,853 B2 * 2/2017 Gostein .................. H02S 50/10
9,837,957 B2 * 12/2017 Kouno .................. G01R 27/02
(Continued)

FOREIGN PATENT DOCUMENTS

KR    20190072084 A    6/2019

OTHER PUBLICATIONS

International Search Report (PCT/ISA/210) with translation and Written Opinion (PCT/ISA/237) mailed on Jan. 12, 2022, by the European Patent Office as the International Searching Authority for International Application No. PCT/FR2021/000094. (11 pages).

*Primary Examiner* — Hal Kaplan
(74) *Attorney, Agent, or Firm* — Buchanan Ingersoll & Rooney PC

(57) ABSTRACT

A device for managing a surplus of power of a photovoltaic generator that supplies power to electrical appliances connected to the photovoltaic generator, the surplus of power being the difference between the maximum potential electrical power that the photovoltaic generator could produce at a given time taking into account its illumination, and the electrical power actually consumed at that time by the electrical appliances. The device includes a photoelectric control sensor to measure solar light intensity received by the photovoltaic panels and to deduce the maximum potential electrical power; a means for determining the surplus of
(Continued)

available power between the value of the maximum potential electrical power and the value of the electrical power actually consumed by the electrical appliances; and a means for managing the surplus of available power, the means being configured to redirect and distribute the surplus of available power between the electrical appliances.

26 Claims, 3 Drawing Sheets

(51) Int. Cl.
    *H02J 7/35*     (2006.01)
    *H02S 40/32*     (2014.01)

(58) Field of Classification Search
    USPC .......................................................... 307/82
    See application file for complete search history.

(56) References Cited

U.S. PATENT DOCUMENTS

| | | |
|---|---|---|
| 2009/0000659 A1 | 1/2009 | Hasegawa et al. |
| 2015/0280644 A1 | 10/2015 | Gostein et al. |
| 2016/0315584 A1 | 10/2016 | Kouno et al. |

\* cited by examiner

DEVICE AND METHOD FOR DETERMINING AND USING A SURPLUS OF AVAILABLE ELECTRICAL POWER GENERATED BY A SOLAR PHOTOVOLTAIC GENERATOR

FIELD OF THE INVENTION

The present invention relates to the field of photovoltaic solar energy and more particularly to the field of managing this energy in order to optimize the production, storage and use of the electrical energy which may be produced from solar energy.

PRIOR ART

In a known way, a device for producing electrical energy by means of photovoltaic solar panels generally comprises a set of photovoltaic panels linked together for producing a voltage and an electrical current that are able to supply power either to electrical appliances for immediate use of the electrical energy or to batteries which allow the temporary storage of this electrical energy for use at a later time. Specifically, solar irradiation is very variable and is dependent, among other things, on the time of the day, on the sunlight and on the seasons.

It is thus necessary to manage as well as possible the solar electrical energy generated, on the one hand, for supplying power to appliances according to their electrical power consumption and, on the other hand, for storing the electrical energy of solar origin that has not been used in order to use it at other times, in particular at night. This management is generally ensured automatically by an electrical box of the inverter type which converts the DC current of the photovoltaic energy coming from a solar panel into AC current. The inverter then redirects the photovoltaic energy toward connected electrical appliances that are able to operate at that time, or toward a storage device such as electric batteries or else such as a water tank that is heated and is then used as a means for storing thermal energy. Another advantageous option is to sell the electrical current that is generated but not used locally, by injecting it via the inverter into a public electrical grid.

However, the known devices for managing the available electrical energy of solar origin in real time do not make it possible to determine and manage the power that is potentially available, beyond that which is consumed at a given time by the electrical appliances connected to the inverter. This management would require the continuous determination of the value of power that is potentially available, either by direct measurement or by calculation, this not being done in the present prior art. Specifically, the majority of the existing boxes, the function of which is to manage the surplus of solar energy that is not consumed, only detect and divert to a predetermined local appliance the current that the inverter plans to inject into the public grid. From a practical point of view, an electrical current sensor is placed around the electrical wire for injecting into the public grid, in order to measure the intensity of the electrical current leaving toward the public grid and therefore the presence of a surplus of photovoltaic energy production with respect to that consumed locally at a given time. This continuous testing makes it possible to redirect the existing surplus of electrical energy toward the public electricity grid.

Some photovoltaic systems are however not linked to a public grid and are therefore completely electrically isolated, this making it impossible, in the present prior art, to measure the surplus of available electrical energy and therefore making it impossible to use it or to electrically or thermally store it, meaning that this surplus of available electrical energy is then lost.

For off-grid photovoltaic systems, it is not possible to inject the electrical current into a public electrical grid. The presence of a surplus of photovoltaic energy with respect to the instantaneous consumption of the consumption site is thus detected during the charging of a battery, this in effect indicating that the instantaneous photovoltaic power available is greater than the instantaneous power consumed by the electrical appliances connected to the off-grid system.

This indication of the existence of a surplus of power then makes it possible to balance the operation of a device for thermally storing this surplus of electrical energy, for example by supplying power to the electrical resistor of a water heater by way of a power controller which automatically varies the power consumption of said water heater proportionally to the photovoltaic electrical power available in surplus. This automatic controller generally takes into account the charge level of the battery used and the charging parameters thereof so as to optimize the thermal storage operation according to the charge level of the battery.

Like photovoltaic systems that inject the current into a public grid, off-grid photovoltaic systems that do not inject current into a public grid require multiple operating sensors, in particular in the region of the battery for storing the surplus of energy and/or regarding the charging characteristics of said battery, this then involving having electronic controls which are compatible with each type of battery. These constraints make these known devices very complex and quite expensive.

AIM OF THE INVENTION

One aim of the invention is to propose a novel, particularly simple and economical device for determining in real time the surplus of electrical energy of photovoltaic origin which is not used by the connected appliances of a consumption site at a given time in order to be able to use or store this surplus of energy, for example in the form of electrical, thermal or chemical energy.

Another aim of the invention is to propose a device which is independent of the type of battery used for storing the surplus of energy, and which allows simplified management of the operating priorities of the connected appliances, in particular according to their power consumption.

Another aim of the invention is to propose a device which is capable of putting into operation and supplying power to electrical appliances or systems for storing additional energy so as to optimize the use or the storage of the maximum amount of surplus photovoltaic electrical energy that is available at each time and not used by the electrical appliances that are normally connected.

SUMMARY OF THE INVENTION

In principle, the device that is the subject of this invention comprises, in a novel way, a device (S) that is capable of continuously determining, by measurement or by calculation, on the one hand the maximum potential power, denoted P1, that is able to be supplied by a set of photovoltaic solar panels (PV) of a photovoltaic generator system (G) according to the sunlight at a given time t, and on the other hand the surplus of available power, denoted P3, with respect to the power consumed at this time t by the electrical appliances in operation, denoted P2.

Maximum potential power P1 here is not understood to mean the maximum power that the photovoltaic generator could theoretically produce under optimal sunlight, which is a fixed value called "peak" power, but the actual maximum power that said generator is able to produce at each time t taking into account the actual sunlight at this time, which is therefore by nature a value which varies over time. "Peak" power is understood to mean the maximum electrical power that a photovoltaic solar panel is able to generate when it is irradiated by sunlight of 1000 W/m$^2$ and when this radiation is perpendicular to its surface. Generally, said solar panel only receives some of the maximum solar radiation because this radiation is filtered by the atmosphere which is more or less cloudy, and the angle of incidence of said radiation varies with the time of day.

The invention likewise deals with the implementation of this device (S) in a photovoltaic generator system (G) for using or storing the surplus of power P3 that is available at a time t and not used.

The photovoltaic generator system (G) comprises a set of photovoltaic solar panels (PV) that are able to produce, at a time t, a maximum electrical power denoted P1. This electrical power P1 is in part dependent on the intensity of the solar radiation received at this time t and on the "peak" power of said solar panels (PV).

Said photovoltaic generator (G) also comprises:
- a plurality of electrical appliances (A) that are supplied with power by the electrical energy from the solar panels (PV). These electrical appliances (A) consume, at this time t, a total measured electrical power which is equal to P2 and which is less than P1.
- a device (S) for measuring or calculating the photovoltaic electrical power P3 which remains available for consumption at this time t and which is approximately equal to P3=P1−P2.

The first subject of the invention is therefore a device (S) for managing a surplus (P3) of photovoltaic power available at the terminals of a photovoltaic generator (DE) provided with photovoltaic panels (PV) that are capable of supplying power to fixed-power electrical appliances (AF) and variable-power electrical appliances (AV) connected to said photovoltaic generator (DE), said surplus of power (P3) being equal to the difference at each time t between the maximum potential electrical power (P1) that said photovoltaic generator (DE) could produce taking into account its illumination, and the electrical power (P2) actually consumed at each time t by said electrical appliances (AF, AV), characterized in that it includes:
- a photoelectric control sensor (PE) that is able to measure at each time t the solar light intensity received by said photovoltaic panels (PV) and to deduce therefrom said maximum potential electrical power (P1);
- a means (MP3) for determining the surplus (P3) of available power, compared at this time t, between the value of the maximum potential electrical power (P1) and the value of the electrical power (P2) actually consumed by said electrical appliances (AF; AV);
- and a means (MPG) for managing said surplus (P3) of available power, said means being configured to redirect and distribute said surplus (P3) of available power between said electrical appliances (AF, AV).

According to one embodiment, said means (MPG) for managing the surplus (P3) of power is configured to control the putting into operation of and the supply of electricity to at least one additional electrical appliance (AF), or the increase in the consumption of an electrical appliance (AF, AV) that is already connected to the photovoltaic generator (DE).

This arrangement makes it possible to maximize the use of said surplus of power (P3) available at the terminals of the photovoltaic generator (DE) by increasing the power (P2) consumed or stored by electrical appliances.

According to one embodiment, the photoelectric control sensor (PE) is configured to measure the solar light intensity received by said photovoltaic panels (PV) and to produce an electrical current that is proportional to said light intensity and therefore proportional to the maximum potential power (P1) that the photovoltaic generator (DE) could produce at each time t.

According to embodiments, said photoelectric control sensor (PE) may be composed of a photoresistor, a phototransistor, a photodiode, a pyranometer, or preferably of a photovoltaic control surface (V).

In the preferred case in which said photoelectric control sensor (PE) is composed of a photovoltaic surface (V), the latter may be formed by a single photovoltaic cell or by a plurality of photovoltaic cells connected in series or in parallel, with an overall size of less than that of said photovoltaic panels (PV), and oriented parallel to the surface of the photovoltaic panels (PV) so as to receive the same light intensity as the photovoltaic panels (PV) and to produce an electrical power (P4) that is representative of the maximum potential power (P1) of the photovoltaic panels (PV).

The photovoltaic control surface (V) is capable of sensing the ambient light energy that reaches the solar panels (PV). It must necessarily be independent of the production photovoltaic solar panels (PV) and preferably be positioned close to said solar panels (PV) in order to collect the same sunlight.

According to one embodiment, said means (MP3) for determining the surplus of power (P3) comprises an electronic microcomputer which receives, at input, analog information from at least one analog sensor (T1, T2, T3) positioned so as to sense the electrical intensities I(pe), I(pv) and I(pwm) which flow through the control sensor (PE), the photovoltaic panels (PV) and the electrical appliances (AF, AV), respectively, said electronic microcomputer (MP3) being configured to produce an analog or digital signal S(i) that is representative of the value of the surplus (P3) of available power.

According to one advantageous embodiment, said means (MP3) for determining the surplus (P3) of available power comprises analog sensors (T1, T2, T3) composed of Hall-effect toroids.

According to one preferred and particularly simple embodiment, said means (MP3) for determining the surplus of power (P3) available at each time t comprises an analog sensor (T) composed of a single Hall-effect toroid that is simultaneously passed through by a first electrical conductor (F2) coming from the photovoltaic panels (PV) and flown through by an electrical current I(pv), and by a second electrical conductor (F1) coming from the photoelectric control component (PE) and flown through by a current I(p) produced by said photoelectric component (PE) measuring the solar luminosity, said Hall-effect toroid (T) then producing, at output, an electrical signal S(i) that is representative of the surplus of power (P3) available at each time t.

According to one embodiment, said Hall-effect toroid (T) is furthermore passed through by a third electrical conductor (F3) flown through by the current I(pwm) for supplying power to the variable-power electrical appliances (AV).

According to one embodiment, said means (MPG) for managing the surplus of available power (P3) involves a manual action from an operator according to an indication by the device (S) of the existence of a surplus of available power (P3).

As a variant, said means (MPG) for managing the surplus of available power (P3) is composed of an electronic automatic controller which controls the instantaneous value of the surplus of available power (P3), said automatic controller being configured to minimize the surplus of available electrical power (P3) and to maximize the electrical power (P2) consumed by the electrical appliances (AF, AV).

According to one embodiment, said automatic controller is designed to put into operation or to supply power to one or more electrical appliances (AF, AV) the fixed or variable power consumption of which is compatible with the surplus (P3) of available power, and to choose the appliances receiving all or some of the surplus (P3) of available power, according to a grid of priorities predefined by the user.

According to one embodiment, said means (MPG) for managing the surplus (P3) of available power includes a circuit for controlling the variable-power electrical appliances (AV) receiving the value of the surplus (P3) of available power, via an emitter (C1) and a receiver (C2) that are integrated in the device (S) and connected by means of an electrical, electromagnetic or light-based communication link.

According to one embodiment, said circuit for controlling said means (MPG) for managing the surplus (P3) of available power is configured to control the modulation of the power supply to the variable-power appliances (AV), for example by pulse-width modulation (PWM).

Another subject of the invention is a system (G) including a photovoltaic generator (DE) provided with photovoltaic panels (PV) supplying power to fixed-power electrical appliances (AF) or to variable-power electrical appliances (AV), characterized in that it includes a device (S) for managing a surplus (P3) of photovoltaic power available at the terminals of a photovoltaic generator as described above so as to maximize the use of a surplus (P3) of photovoltaic power available at a time t at the terminals of said photovoltaic generator (DE).

According to one embodiment of the system (G), it includes an inverter (D) connected between the photovoltaic panels (PV) and said electrical appliances (AF, AV), and the output of the inverter (D) is connected to the variable-power-supply electrical appliances (AV) via said device (S) for managing the surplus (P3) of available photovoltaic power such that the variable-power electrical appliances (AV) are supplied with electrical power according to the surplus (P3) of power available at each time t.

According to one embodiment of the system (G), the components of said device (S) for managing the surplus (P3) of power are integrated directly in said inverter (D), with the exception of the photoelectric control sensor (PE) which remains exposed to the same sunlight as the photovoltaic panels (PV).

According to one embodiment of the system (G), the variable-power-supply electrical appliances (AV) include appliances of the following types: hydraulic pumps, heating resistors, refrigerating units, fans, atmospheric water generators, room dehumidifiers, redox-flow batteries, electric-vehicle batteries, and hydrogen fuel cells.

According to one embodiment of the system (G), it includes a first device of MPPT ("Maximum Power Point Tracking") type arranged between the solar panels (PV) and the inverter (D), and a second MPPT device arranged between the photoelectric control sensor (PE) and the means (MP3) for determining the surplus (P3) of available power.

According to one embodiment of the system (G), at least one of said electrical appliances is, for one part, of fixed-power-supply type (AF) and, for another part, of variable-power-supply type (AV), such as, for example, an atmospheric water generator comprising, for one part, an atmospheric dehumidifier which condenses atmospheric water into a tank and which operates in variable-power-supply mode (AV), and comprising, for another part, a system for filtering and purifying the water collected in said tank and which operates in fixed-power-supply mode (AF).

According to one embodiment of the system (G), said electrical appliances (AF, AV) are dimensioned so as to be able to consume all of the potential electrical power (P1) produced by the photovoltaic panels (PV), including the surplus (P3) of power available at each time t. In this way, it is ensured that all of the electrical power that is capable of being generated by the system (G) in all sunlight conditions will be used, eliminating any energy waste.

According to one embodiment of the system (G), it is arranged either on an off-grid site without the possibility of transferring electrical current with a public electrical energy distribution grid, or connected to a public electrical energy distribution grid so as to make it possible to receive, as required, additional electricity from the public electrical energy distribution grid or to inject into said public grid all or some of said surplus (P3) of power measured or calculated by said managing device (S).

Another subject of the invention is an inverter that is able to transform a DC current delivered by a photovoltaic generator into an AC current intended to supply power to the electrical appliances (AF, AV), characterized in that it has directly integrated therein a device (S) for managing the surplus (P3) of available power as described above.

Yet another subject of the invention is a method for managing a surplus (P3) of electrical power available at the terminals of a photovoltaic generator, characterized in that it includes steps consisting in:

Determining the maximum potential power (P1) that is able to be delivered by said photovoltaic generator at each time t, according to the sunlight received at this time;

Determining the power (P2) consumed at the time t by the group of the electrical appliances (AF, AV) connected to said photovoltaic generator;

Determining a surplus (P3) of power available at the time t, corresponding to the difference P1−P2;

In the case of a positive value of the surplus (P3) of available power, putting into operation and/or supplying electrical power to at least one electrical appliance so as to maximize the value of the power (P2) consumed and to minimize the value of the surplus (P3) of power available at a later time t+delta t.

DETAILED DESCRIPTION OF THE INVENTION

The invention is now described in more detail with the aid of the figures, in which.

Figure 1:
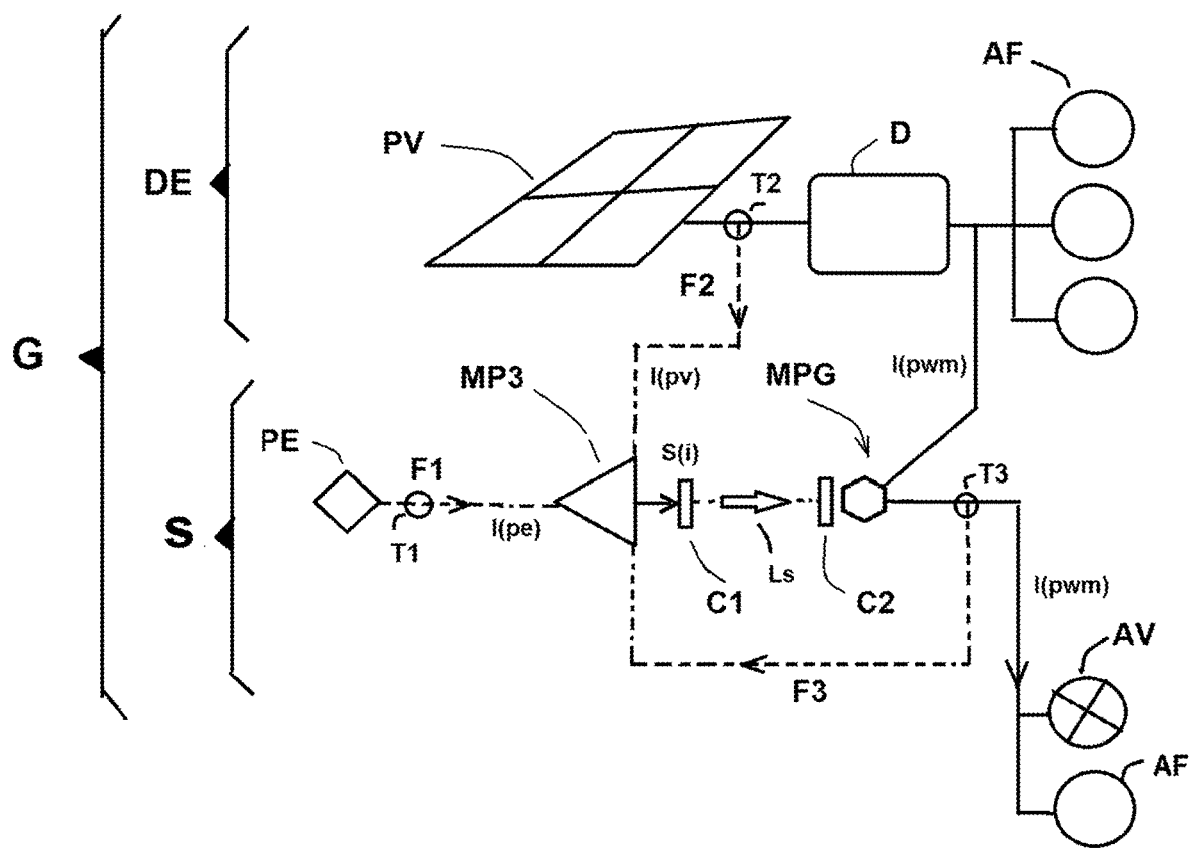
FIG. 1 is a basic diagram of a photovoltaic generator system (G) including a device (S) according to the invention for measuring or calculating the surplus (P3) of photovoltaic electrical power which remains available at each time t, beyond the power (P2) consumed at this time by the connected electrical appliances.
Figure 2:
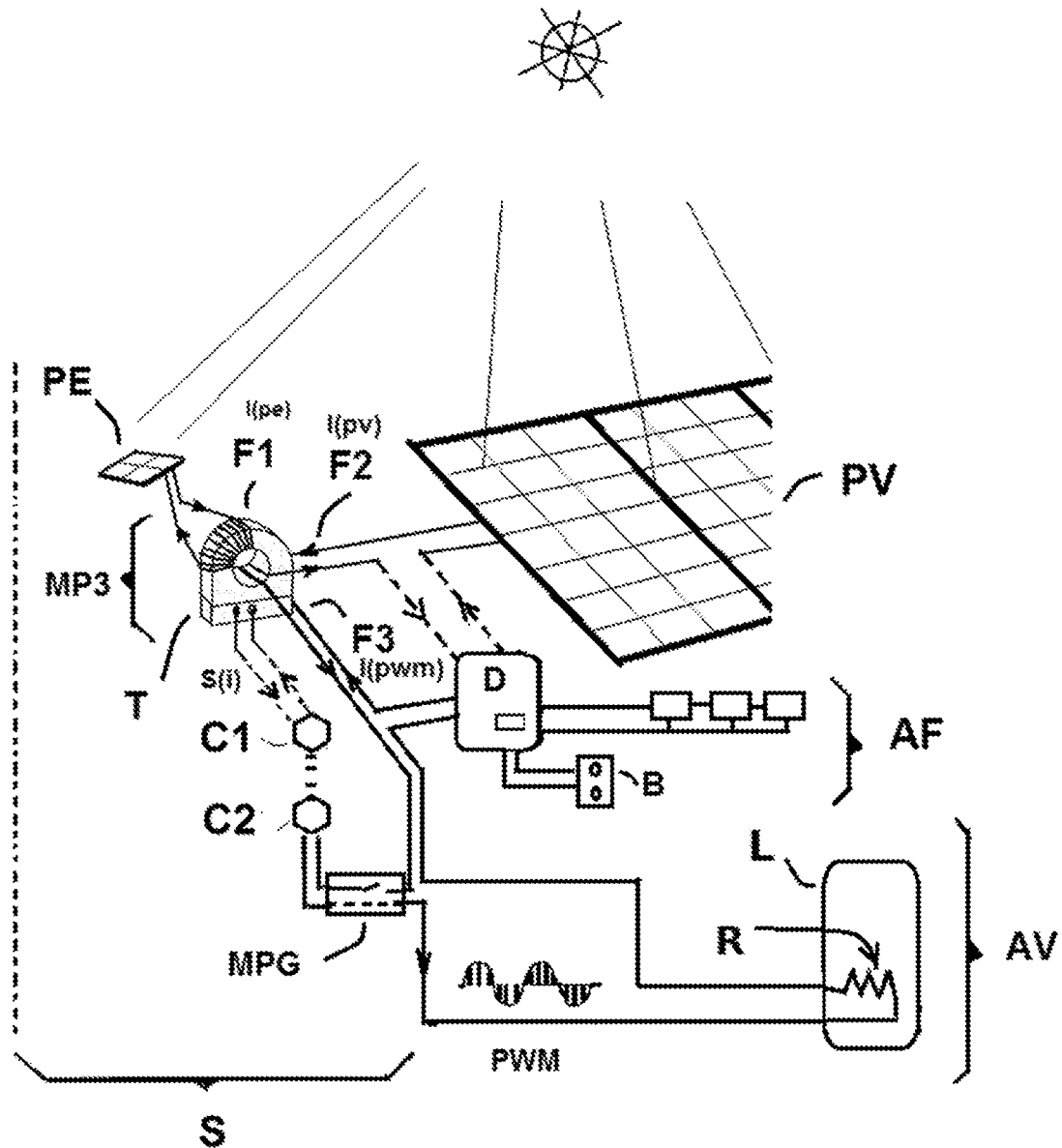
FIG. 2 is a diagram of a first embodiment of a photovoltaic generator system (G) of FIG. 1.

FIG. 1 shows the main elements of the system (G) that is the subject of the invention. The system (G) for producing and using photovoltaic electricity comprises a set of photovoltaic solar panels (PV), an inverter (D) which transforms the DC electrical current supplied by the solar panels (PV) into AC current which supplies power to a plurality of electrical appliances (AF, AV). Among these electrical appliances, there are appliances (AF) which require a voltage, or an average power supply intensity, which must be fixed or relatively stable such as a computer, a refrigerator or a washing machine, for example, and other appliances denoted (AV) the voltage or power supply intensity of which may be variable, as shown in FIG. 2, for example an electric battery (B), a water heater (L) with a thermal resistor (R), filament lamps or dimmable LED lamps which are compatible with a switched-mode power supply of PWM type.

When the fixed-power electrical appliances (AF) are consuming little energy, this means that the power P2 consumed is low. When, at a given time t, the solar panels (PV) have a potential electrical production capacity of P1 (as defined above) that is greater than the power P2 consumed at this time t, there arises a surplus of electrical energy P3=P1−P2 which is available at the output of the photovoltaic panels (PV) and (except for losses) at the output of the inverter (D). However, this surplus P3 of available power is not consumed at this time by the appliances (AF) and is therefore lost, this moreover constituting under-use of the investment made for installing the photovoltaic generator system (G).

In order to determine, by calculation or by measurement, said surplus P3 of electrical energy that is not consumed, the system (G) comprises a device (S) for determining and managing this surplus P3.

According to the invention, this device (S) includes:

a photoelectric control sensor (PE) that is able to measure at each time t the solar light intensity received by said photovoltaic panels (PV) and to deduce therefrom said maximum potential electrical power (P1) that the panels are able to generate taking into account their sunlight;

a means (MP3) for determining a surplus (P3) of available power, compared at this time t, between the value of the maximum potential electrical power (P1) and the value of the electrical power (P2) actually consumed by electrical appliances (AF);

and a means (MPG) for managing said surplus (P3) of available power, said means being configured to control either the putting into operation of and the supply of electricity to at least one additional electrical appliance (AF, AV), or the increase in the consumption of an electrical appliance (AF, AV) that is already connected to the photovoltaic generator (DE), so as to maximize the use of the surplus (P3) of power available at the terminals of the photovoltaic generator (DE) and to redirect and distribute it between said electrical appliances (AF, AV).

According to the invention, said photoelectric control sensor (PE) is configured to measure the solar light intensity received by said photovoltaic panels (PV) and to produce an electrical current that is proportional to said light intensity and therefore proportional to the maximum potential power (P1) that the photovoltaic generator (DE) could produce at each time t.

The photoelectric control sensor (PE) is oriented so as to receive a light irradiation that is proportional to that received by the solar panels (PV) such that the power denoted P4 measured at the terminals of the photoelectric sensor (PE) makes it possible, by extrapolation, to calculate, at the time t, said maximum potential electrical power P1 of the solar panels (PV) and to deduce therefrom the value of the surplus P3 of photovoltaic electrical power which remains available for consumption at this time t and which is approximately equal to P3=P1−P2. This equality is approximate because it does not take into account, for example, electrical losses due to the transport of the current (Joule effect) or losses with respect to a rise in the ambient temperature which generally induces a reduction in the performance of the appliances and electrical components.

Once the value of the maximum potential photovoltaic power P1 is known, it is easy to calculate the surplus of unconsumed energy which is equal to P3=P1−P2, P2 being the measurement of the power consumed by the electrical appliances.

The photoelectric control sensor (PE) may be embodied in various ways. It may be a photoresistor, a phototransistor, a photodiode, or else a pyranometer.

However, according to one particularly simple, economical and efficient embodiment, said photoelectric control sensor (PE) is preferably composed of a photovoltaic control surface (V) formed by a single cell or by a plurality of cells connected in series or in parallel, with an overall size of less than that of said photovoltaic panels (PV), and oriented parallel to the surface of these photovoltaic panels (PV) so as to receive the same light intensity as them. This control sensor (V) then produces a power (P4) that is representative of the maximum potential power (P1) of the photovoltaic panels (PV).

In the remainder of the description, for the sake of simplicity but without limiting the invention to this embodiment, it will be considered that the photoelectric control sensor (PE) is effectively embodied in the form of a photovoltaic surface (V) of small size, acting as photovoltaic control surface producing a low electrical power P4 and having the same performance characteristics as the production photovoltaic panels (PV). This photovoltaic control surface (V) does not aim to produce electrical power for connected appliances but must provide the system with information about the potential power P1 that the production panels (PV) are able to produce at each time depending on the actual sunlight characteristics.

It is known that photovoltaic cells produce an electrical power which is substantially proportional to the size of their surface area. Knowing the surface area L1 of the solar panels (PV) and the surface area L2 of the photovoltaic control surface (V) of the reference device(S), it is possible to calculate the potential power P1 of the set of the solar panels (PV) which is equal to P1=P4*(L1/L2), and from a more general point of view P1=(x*P4)+z, x and z being fixed values that are dependent on the geometrical and photoelectrical characteristics of the solar panels (PV) and of said photovoltaic control surface (V).

From a practical point of view, the measurements and the calculations of optimal powers of P1 and/or P4 are made by way of a so-called MPPT ("Maximum Power Point Tracking") device which makes it possible to adjust the voltage and/or the intensity of the charging current so as to position the photovoltaic cells at their maximum efficiency and therefore at their maximum power. This MPPT device may then possibly be used on the device (S) in order to measure the power P4 delivered by the photovoltaic control sensor (V) and also on the production photovoltaic panels (PV) in order to optimize the production potential power P1.

According to one particular embodiment, the surplus of electrical power P3 that is available at a time t and not consumed by the electrical appliances (AF) is used to supply power to at least one electrical appliance (AV) that is able to operate under a variable voltage, therefore with a variable power consumption, such as, for example, an electric battery (B) the average charging electrical intensity of which may be variable, or a device for heating a water tank (L) by means of at least one electrical resistor (R) the average heating electrical power of which may be variable, or else a device for pumping water the hydraulic flow of which may be variable.

However, if the surplus P3 of power is sufficiently stable, it may also be used to supply power to an additional appliance of fixed-power-supply type (AF).

The average electrical power extracted from the surplus of power P3 at a time t and directed by the device (S) toward the appliances (AV, AF) then increases the value P2 of the instantaneous power consumed by all of the connected electrical appliances, this lowering the value of the surplus P3 of power available at a later time t+delta t, this in turn lowering the variable power consumption (CV) of the appliances (AV) that are able to operate with this variable power consumption (CV). A control procedure is thus present which puts in place an equilibrium in which the surplus of power P3 is largely consumed by said appliances (AV) that are able to operate with a variable power consumption (CV), this without modifying the electrical consumption of the other appliances (AF) which are in operation at this time t and the power consumption of which is fixed.

"Variable power", "variable voltage", "variable intensity" are understood to mean "RMS" values which may vary over time. Thus, a sinusoidal voltage supply of 220 V RMS, although sinusoidal, is only considered to be "variable" here if its "RMS" value is variable. The same applies to the intensity and the power.

In one particular embodiment of the device (S) according to the invention, some electrical appliances (AV) which are able to operate under a variable voltage and/or electrical intensity, therefore with a variable power consumption (CV), are supplied with power by a voltage of PWM ("Pulse-Width Modulation") type.

The means (MP3) for determining the surplus of power (P3) of the managing device (S) schematically shown in FIG. 1 may comprise an electronic microcomputer which receives, at input, analog information from at least one analog sensor (T1, T2, T3). These sensors (T1, T2, T3) transmit, via communication links (F1, F2, F3) schematically shown by dashed lines, the electrical intensity I(pe) coming from the control sensor (V), the electrical intensity I(pv) coming from the photovoltaic panels (PV), and the electrical intensity I(pwm) corresponding to the surplus P3 which is variable and which supplies power to the electrical appliances via the inverter (D), it being possible for these appliances to be of AF (fixed nominal power) type or of AV (variable nominal power) type. These communication links (F1, F2, F3) may of course be wired or wireless, for example by electromagnetic or light-based means.

Figure 3:
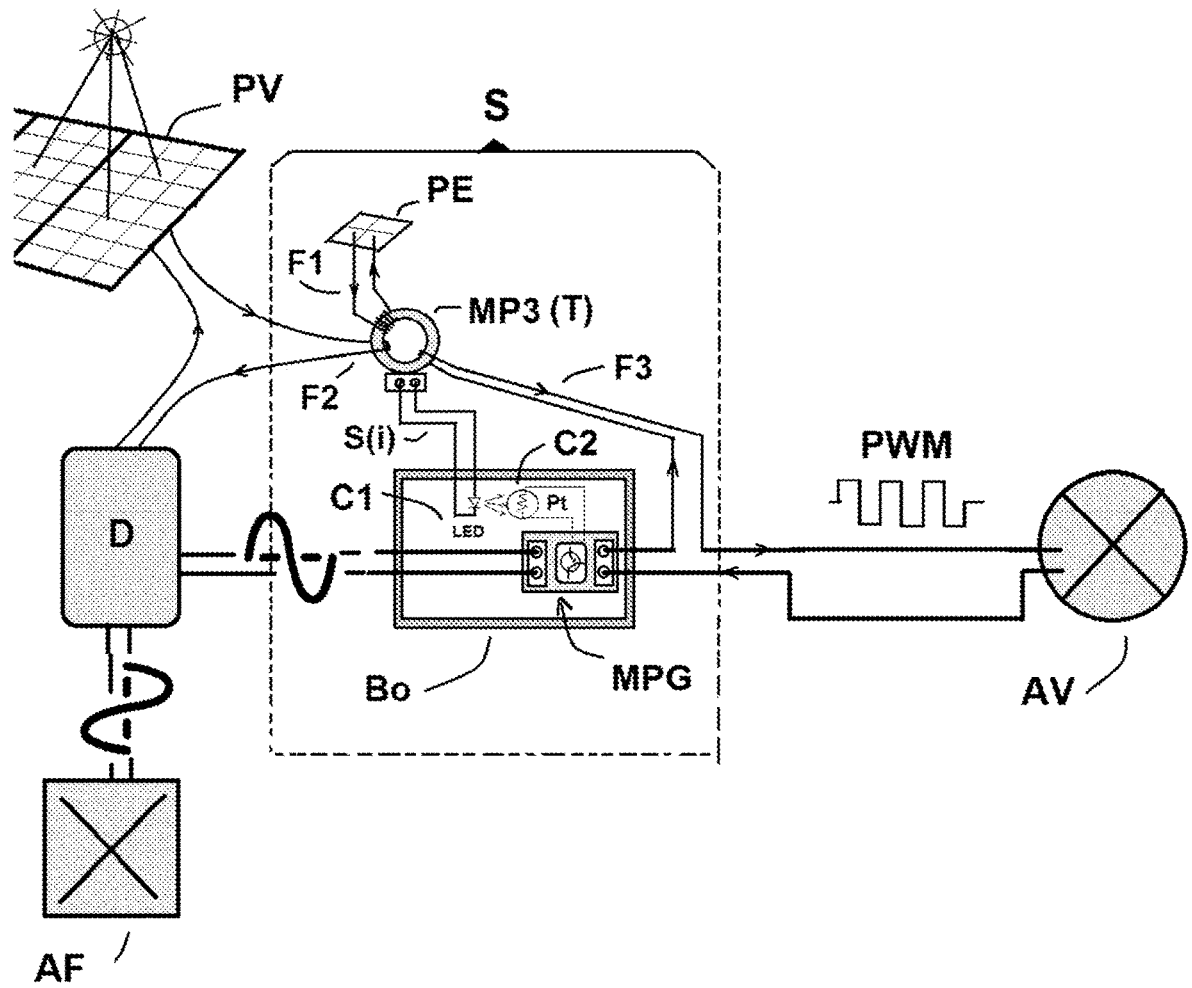
FIG. 3 is a diagram of a second embodiment of a photovoltaic generator system (G) of FIG. 1.

The means (MP3) for determining the surplus of power P3, whether it be a microcomputer or a single analog toroid as shown in FIGS. 2 and 3, is configured to produce, based on the values transmitted by the sensors (T1, T2, T3), in particular the values of electrical current, an analog or digital signal S(i) that is representative of the value of the surplus (P3) of available power. This signal S(i) output from the circuit (MP3) is then transmitted to an emitter (C1) which in turn transmits it to a receiver (C2) via a link (Ls) of galvanic, electromagnetic or optical type, schematically shown by an arrow in FIG. 1.

The receiver (C2) is connected to the input of a means (MPG) for managing the surplus (P3) of available power which will in particular redirect and distribute the surplus (P3) of available power in real time toward the various connected electrical appliances, in particular the appliances of variable power consumption type (AV).

According to one basic embodiment, the signal S(i) supplied by the circuit (MP3) may be a visual or audible signal, and the means (MPG) for managing the surplus (P3) of available power then involves a simple manual action from an operator who actuates one or more switches in order to redirect the surplus (P3) of available power toward one electrical appliance or another (AF, AV) of the system (G).

According to one automated and much more efficient embodiment, said means (MPG) for managing the surplus (P3) of available power is composed of an electronic automatic controller which controls the instantaneous value of the surplus (P3) of available power. This automatic controller is thus configured to maximize the electrical power (P2) consumed by the electrical appliances (AF, AV) and therefore progressively minimize the surplus (P3) of available power.

According to one aspect of the invention, this automatic controller is designed to put into operation or to supply power to one or more appliances (AF, AV) the fixed or variable power consumption of which is compatible with the power (P3) available in surplus, and the choice as to the said appliance(s) receiving all or some of the surplus of power (P3) can be made according to a grid of priorities predefined by the user.

According to one embodiment that is advantageous in practice, the means (MPG) for managing the surplus (P3) of available power is configured to control the modulation of the power supply to the variable-power appliances (AV2) by way of a modulated control signal, for example by pulse-width modulation (PWM).

From a practical point of view, it is wise to measure said intensities I(pe), I(pv) and I(pwm) by way of sensors (T1, T2, T3) composed of one or more Hall-effect toroids, as shown in the exemplary embodiments of FIGS. 2 and 3.

As shown in FIG. 2, the intensity I(pv) of the electrical current which is actually produced by the photovoltaic panels (PV) is measured using a single Hall-effect toroid (T) which surrounds the electrical wires F2 at the output of the panels (PV). This information about intensity I(pv) provides information about the electrical power P2 supplied to the inverter (D) and therefore consumed by the whole group of appliances.

Moreover, the intensity of the current intensity I(pe) produced by the control sensor (PE), in particular in the form of a control surface PV and which provides information, by extrapolation, about the maximum potential photovoltaic power P1 that the solar panels (PV) could produce at a time t, is measured using the same toroid (T).

As shown in FIG. 2, the toroid (T) is, on the one hand, passed through by a cable F1 which is connected to the photovoltaic control surface (PE=V) and possibly has a plurality of windings around the toroid T and, on the other hand, by a cable F2 which is connected to the photovoltaic solar panels (PV). In this case, the two cables F1 and F2 are flown through by electrical currents I(pe) and I(pv), respectively, which flow in opposite directions.

The toroid (T) then delivers, at output, a signal S(i) that is proportional to the difference between I(pe) and I(pv). This electronic comparison is equivalent to the equation P3=P1−P2. The signal S(i) output from the toroid (T) is representative of the power (P3) which is available in surplus and which is not being consumed at the time t. This information S(i) is transmitted to an emitter (C1) which passes it on to a receiver (C2) in an electrical, optical or electromagnetic manner. The receiver (C2) transmits the information S(i) to the circuit (MPG) for managing the surplus (P3) which may then supply an output voltage to gradually actuate, by varying the voltage (possibly of PWM "Pulse-Width Modulation" type) or by varying the intensity, the electrical power supply to one or more resistive loads, such as, for example, a heating resistor (R) for heating a water tank (L) or the charging of a battery (B) of AF type.

The power consumed by the appliances which receive an electrical power supply controlled by the circuit (MPG) then corresponds to the surplus (P3) of photovoltaic energy available in real time such that said surplus of energy (P3) is used in its entirety or in part, for example by the variable-power-consumption appliances (AV) without modifying the ongoing operation of the fixed-power-consumption appliances AF.

In another particular embodiment corresponding to FIG. 3, the means (MP3) for determining the surplus (P3) of available power again includes a single toroid (T) on which three cables F1, F2, F3 are wound, said cables being positioned such that:
- the cable F1 is flown through by a current I(pe) flowing in the forward direction and produced by the photovoltaic control surface (PE=V);
- the cable F2 is flown through by a current I(pv) flowing in the reverse direction and produced by the solar panels (PV) which supply power to the group of the electrical appliances,
- the cable F3 is flown through by a current I1(pwm) flowing in the forward direction and corresponding to the production of the surplus (P3) consumed by the appliances (AV) at a time t1,
- the cable F3 is also flown through by a current I2(pwm) flowing in the forward direction and corresponding to the production of the surplus (P3) of power consumed by the appliances (AV) at a time t1+delta t.

The result of this combination is a control procedure which is modeled by the equation: I(pe)−I(pv)=I1(pwm)−I2(pwm) wherein:
I(pe)=intensity produced by the photovoltaic control surface (V)
I(pv)=intensity produced by the solar panels (PV) which supply power to the group of the electrical appliances
I1(pwm)=intensity consumed by the appliances (AV) at a time t1
I2(pwm)=intensity consumed by the appliances (AV) at a time t1+delta t It is observed that when I(pe)=I(pv), there is stability and I1(pwm)=I2(pwm).

The additional electrical intensity consumed I1(pwm) and extracted from the surplus (P3) then increases the value of the power (P2) consumed at the time t, this in turn lowering the value of the surplus of power (P3) available at the time t+delta t. This corresponds to a control procedure which puts in place an equilibrium in which the surplus of available power (P3) tends to disappear, in favor of an increase in the consumption (P2) of the appliances.

In the exemplary embodiment shown in FIG. 3, the emitter (C1), to which the signal S(i) output from the toroid (T) is transmitted, constituting the means (MP3) for determining the surplus (P3) of available power is composed of a single LED diode the luminosity of which consequently varies according to the surplus (P3) available at each time t. The receiver (C2) is composed of a single photoresistor the resistance of which varies according to the light intensity received from the LED (C1).

The emitter (C2) thus operates as a potentiometer connected to the input of the circuit (MPG) for managing the surplus (P3). The latter circuit controls the delivery by the inverter (D) of a surplus of power (P3) which may vary in a range comprised between zero and P1, (P3=zero corresponding to a consumption by the already connected electrical appliances of the entirety of the potential power (P1) delivered at this time by the photovoltaic panels (PV)), and P3=P1 corresponding to the absence of consumption of the connected electrical appliances, that is to say P2=0.

In this practical embodiment, the components (C1), (C2) and (MPG) are preferably enclosed in an opaque box (Bo) so that ambient light cannot interfere with the optical transmission between the LED (C1) and the photoresistor (C2).

In another particular embodiment, the electrical intensities I(pe) and I(pv) may be mathematically compared by means of a programmable logic controller (not shown) which supplies, at output, a digital or analog electrical signal S(i) that is representative of the surplus (P3) of power that is available at the time t and is not used.

The invention makes it possible to supply additional electrical power of photovoltaic origin in a large number of potential applications. The advantage is that the maximum amount of the surplus (P3) of available electricity is consumed according to the change in the sunlight conditions of the photovoltaic panels. For this, the PWM (Pulse-Width Modulation) technique is ideal but requires applications which are compatible with variable power consumption.

This is in particular the case for air cooling units which already use the PWM technique, or else atmospheric water generators, or systems for cooling by way of thermoelectric cells.

In the case in which the additional power (P3) is used to charge an electric battery (B), the latter may be of "buffer" type which aims to store the surplus of solar energy and will then be used, for example, to charge an electric vehicle.

Exemplary Embodiment

A photovoltaic generator system (G) comprises:
a. 28 panels (PV) of 360 W peak, that is to say a total peak power of around 10 kWc and a total surface area of 60 m$^2$
b. 2 hybrid inverters (D) of 5 kW of power assembled in parallel
c. 2 lithium-ion batteries (B) of 2.4 kWh, that is to say a total of 4.8 kWh
d. a plurality of fixed-effective-operating-power electrical appliances (AF) (washing machine, computer, refrigerator, clothes dryer, microwave oven)
e. a plurality of variable-effective-power appliances (AV) (dimmable LED lamps, electric water heater with a thermal resistor, electric radiators and fans compatible with PWM, swimming-pool water pump, car battery)
f. a device (S) for measuring and/or calculating the photovoltaic energy available in surplus and comprising a small photovoltaic control solar panel (V) of 12 V and of 3 Watts of peak power which covers 180 cm$^2$ of surface area and is oriented in the same way as the solar panels (PV), namely facing south with an inclination of 30 degrees with respect to the ground.

The ratio of surface area between the solar panels (60 m$^2$) and the smaller photovoltaic surface area (180 cm$^2$) is around 3300. Thus, when the photovoltaic control surface (V) produces an instantaneous power of 1 W, this means that the solar panels (PV) will produce up to 3300 W at this moment.

The overall electrical intensity Ipv which is produced by the panels (PV) is measured by a DC toroidal sensor which delivers an intensity that is proportional to the measured intensity and which is of 10 mA per ampere.

The electrical intensity Iv produced by the photovoltaic control surface (V) is substantially proportional to the solar irradiation at that moment and therefore substantially proportional to the maximum production power of the solar panels (PV).

The intensities Ipv and Iv are compared using a Hall-effect toroid which delivers, at output, an electrical signal S(i) which is substantially equal to Ipe-Ipv. This signal S(i) represents, as a proportional value, the available photovoltaic energy which is not consumed by the electrical appliances (AF and AV) at the given time. This signal S(i) controls a power variator of PWM type which is connected to the hot-water tank of the home such that the greater the signal S(i), the more the power variator increases the power supply to the electric water heater in a range of 0 to 2 kW. A temperature sensor cuts this power supply as soon as the temperature of the tank reaches 80° C.

Likewise, and in parallel with the supply of electrical power to the water heater, the battery of the electric car is charged with an intensity which is proportional to Iv, that is to say proportional to the photovoltaic energy available at that moment. Increasing the energy produced by the panels (PV) (and therefore consumed by the appliances) increases the intensity Ipv which decreases the resultant S(i) which in turn decreases the control of the PWM power variator. This control operation results in an energy balance which exhibits a total electrical consumption of the connected appliances that is greater than what would have been if the measuring device (S) according to the invention had not been present. As a matter of fact, in poor sunlight, the maximum power of the panels (PV) was 4.5 kW, for example, with the washing machine, the refrigerator and the clothes dryer consuming 3.5 kW thereof. The surplus of 1 kW was not able to be used because, in its standard version, the water heater would consume 2 kW and the battery of the car 1.5 kW. By virtue of the device (S) according to the invention, the surplus of 1 kW was distributed gradually by the PWM variable-power generator to the water heater and to the battery.

It is estimated that, over a year, the additional solar energy captured and used in this way may be close to at least 25% to 35%, without having to increase the size of the photovoltaic panels.

Advantages of the Invention

Ultimately, the invention successfully meets the set aims. It is particularly simple and economical to implement, using only a few inexpensive components: a small photovoltaic control surface, a DC toroid, a few resistors, an LED, a photoresistor, and possibly a microcomputer.

The invention makes it possible to recover, use or store more energy than in the absence of the device (S), making it possible to use a surplus of available power, it being possible for this to lead either to producing and using more electrical energy for a given size of a photovoltaic generator (G), or to proposing a smaller and less expensive size of a photovoltaic installation, taking into account the increased production yield of electrical energy.

The invention is particularly well suited to a device (G) for producing photovoltaic energy which is not linked to a public electrical grid, for which the prior art does not make it possible to determine and to take advantage of a surplus of photovoltaic power. This situation is still largely the case in a large number of developing countries, even spreading in developed countries in a population searching for energy autonomy.

REMINDER OF REFERENCES

PE: photoelectric control sensor
PV: photovoltaic panels
MP3: means for determining a surplus (P3) of available power
C1: emitter
C2: receiver
B: battery
AF: fixed-power-supply electrical appliance
AV: variable-power-supply electrical appliance
MPG: means for managing a surplus (P3) of available power
PWM: pulse-width modulation
L: hot-water tank
R: resistor of the hot-water tank
F1, F2, F3: wired or wireless electrical links
S(i): signal representative of a surplus (P3) of power
I(pv): electrical current coming from the panels (PV)
I(pe), I(v): electrical current coming from the control sensor (PE) or (V)
I(pwm): surplus current flowing through the electrical appliances AV Reminder of Abbreviations V: control sensor of photovoltaic type
t or t1: time
P1: maximum potential power of the photovoltaic panels
P2: power actually consumed by the electrical appliances
P3: surplus of available electrical power that is able to be supplied by the panels PV and typically not consumed
P4: electrical power supplied by the control sensor PE, V
I1(pwm): intensity consumed by the appliances (AV) at a time t1
I2(pwm): intensity consumed by the appliances (AV) at a time t1+delta t

The invention claimed is:

1. A device for managing a surplus of photovoltaic power available at the terminals of a photovoltaic generator provided with photovoltaic panels that are capable of supplying power to fixed-power electrical appliances and variable-power electrical appliances connected to said photovoltaic generator, said surplus of power being equal to the difference at each time t between the maximum potential electrical power that said photovoltaic generator could produce taking into account its illumination, and the electrical power actually consumed at each time t by said electrical appliances, wherein said device includes:

a photoelectric control sensor that is able to measure at each time t the solar light intensity received by said photovoltaic panels and to deduce therefrom said maximum potential electrical power;

a means for determining said surplus of available power, compared at the time t, between the value of the maximum potential electrical power and the value of the electrical power actually consumed by said electrical appliances;

and a means for managing said surplus of available power, said means being configured to redirect and distribute said surplus of available power between said electrical appliances.

2. The device according to claim 1, wherein said means for managing said surplus of power is configured to control putting into operation and supply of electricity to at least one additional electrical appliance, or an increase in the consumption of an electrical appliance that is already connected to said photovoltaic generator.

3. The device according to claim 1, wherein said photoelectric control sensor is configured to measure the solar light intensity received by said photovoltaic panels and to produce an electrical current that is proportional to said light intensity and therefore proportional to the maximum potential power that said photovoltaic generator could produce at each time t.

4. The device according to claim 1, wherein said photoelectric control sensor is composed of a photoresistor, a phototransistor, a photodiode, a pyranometer, or a photovoltaic control surface.

5. The device according to claim 4, wherein said photoelectric control sensor is composed of a photovoltaic surface formed by a single photovoltaic cell or by a plurality of photovoltaic cells connected in series or in parallel, with an overall size of less than that of said photovoltaic panels, and oriented parallel to the surface of said photovoltaic panels so as to receive the same light intensity as said photovoltaic panels and to produce an electrical power that is representative of the maximum potential power of said photovoltaic panels.

6. The device according to claim 5, wherein an electrical power measured at the terminals of a control sensor of photovoltaic type and a calculated maximum potential power of the solar panels are linked by a mathematical relationship of the type: $P1=(x*P4)+z$, where x and z are fixed values dependent on the geometric and photoelectric characteristics of the panels and of said control photovoltaic surface, P1 is the maximum potential electrical power, and P4 is the electrical power.

7. The device according to claim 1, wherein said means for determining the surplus of power comprises an electronic microcomputer which receives, at input, analog information from at least one analog sensor positioned so as to sense electrical intensities $I(pe)$, $I(pv)$ and $I(pwm)$ which flow respectively through said control sensor, photovoltaic panels and electrical appliances, said electronic microcomputer being configured to produce an analog or digital signal $S(i)$ that is representative of the value of said surplus of available power.

8. The device according to claim 7, wherein said means for determining said surplus of available power comprises analog sensors composed of Hall-effect toroids.

9. The device according to claim 7, wherein said means for determining the surplus of power available at each time t comprises an analog sensor composed of a single Hall-effect toroid that is simultaneously passed through by a first electrical conductor coming from the photovoltaic panels and conducting an electrical current $I(pv)$, and by a second electrical conductor coming from a photoelectric control component and conducting a current $I(pe)$ produced by said photoelectric component measuring the solar luminosity, said Hall-effect toroid producing, at output, an electrical signal $S(i)$ that is representative of the surplus of power available at each time t.

10. The device according to claim 9, wherein said Hall-effect toroid is furthermore passed through by a third electrical conductor conducting the current $I(pwm)$ for supplying power to the variable-power electrical appliances (AV).

11. The device according to claim 9, wherein a photovoltaic control surface is connected to the ends of a conductive wire of low electrical resistance and comprising a number of windings, and which passes through a torus so that the electrical intensity $I(pe)$ which flows through said conductive wire is multiplied by the number at the output of said torus.

12. The device according to claim 1, wherein said means for managing the surplus of available power involves a manual action from an operator according to an indication by the device of the existence of a surplus of available power.

13. The device according to claim 1, wherein said means for managing the surplus of available power is composed of an electronic automatic controller which controls an instantaneous value of the surplus of available power, said automatic controller being configured to minimize the surplus of available electrical power and to maximize the electrical power consumed by the electrical appliances.

14. The device according to claim 13, wherein said automatic controller is designed to put into operation or to supply power to one or more electrical appliances the fixed or variable power consumption of which is compatible with the surplus of available power, and to choose the appliances receiving all or some of the surplus of available power, according to a grid of priorities predefined by a user.

15. The device according to claim 12, wherein said means for managing the surplus of available power includes a circuit for controlling the variable-power electrical appliances receiving the value of the surplus of available power, via an emitter and a receiver that are integrated in the device and connected by means of an electrical, electromagnetic or light-based communication link.

16. The device according to claim 15, wherein a circuit for controlling said means for managing the surplus of available power is configured to control the modulation of the power supply to the variable-power appliances, by pulse-width modulation.

17. A system including a photovoltaic generator provided with photovoltaic panels supplying power to fixed-power electrical appliances or to variable-power electrical appliances, wherein said system includes a device according to claim 1 for managing a surplus of photovoltaic power available at the terminals of a photovoltaic generator so as to maximize the use of a surplus of photovoltaic power available at a time t at the terminals of said photovoltaic generator.

18. The system according to claim 17, including an inverter connected between the photovoltaic panels and said electrical appliances, wherein the output of the inverter is connected to a variable-power-supply electrical appliances via said device for managing the surplus of available photovoltaic power such that the variable-power electrical appliances are supplied with electrical power according to the surplus of power available at each time t.

19. The system according to claim 17, wherein components of said device for managing the surplus of power are integrated directly in said inverter, with the exception of the photoelectric control sensor which remains exposed to the same sunlight as the photovoltaic panels.

20. The system according to claim 17, wherein the variable-power electrical appliances include appliances selected from one or more of the following types: hydraulic pumps, heating resistors, refrigerating units, fans, atmospheric water generators, room dehumidifiers, redox-flow batteries, electric-vehicle batteries, and hydrogen fuel cells.

21. The system according to claim 17, including a first device of MPPT ("Maximum Power Point Tracking") type arranged between the solar panels and the inverter, and a second MPPT device arranged between the photoelectric control sensor and the means for determining the surplus of available power.

22. The system according to claim 17, wherein at least one of said electrical appliances is, for one part, of fixed-power-supply type and, for another part, of variable-power-supply type, the variable-power-supply type including an atmospheric water generator comprising, for one part, an atmospheric dehumidifier which condenses atmospheric water into a tank and which operates in variable-power-supply mode, and comprising, for another part, a system for filtering and purifying the water collected in said tank and which operates in fixed-power-supply mode.

23. The system according to claim 17, wherein said electrical appliances are dimensioned so as to be able to consume all of the potential electrical power produced by the photovoltaic panels, including the surplus of power available at each time t.

24. The system according to claim 17, arranged either on an off-grid site without the possibility of transferring electrical current with a public electrical energy distribution grid, or connected to a public electrical energy distribution grid so as to make it possible to receive, as required, additional electricity from the public electrical energy distribution grid or to inject into said public grid all or some of said surplus of power measured or calculated by said managing device.

25. An inverter able to transform a DC current delivered by a photovoltaic generator into an AC current to supply power to electrical appliances, said inverter having a device according to claim 1 integrated therein for managing a surplus of available power.

26. A method for managing a surplus of electrical power available at the terminals of a photovoltaic generator, comprising:
Determining a maximum potential power (P1) that is able to be delivered by said photovoltaic generator at each time t, according to sunlight received at that time;
Determining the power (P2) consumed at the time t by a group of electrical appliances connected to said photovoltaic generator;
Determining a surplus (P3) of power available at the time t, corresponding to the difference P1–P2;
In the case of a positive value of the surplus of available power, putting into operation and/or supplying electrical power to at least one electrical appliance so as to maximize the value of said power consumed and to minimize the value of said surplus of power available at a later time t+delta t.

* * * * *